United States Patent [19]

Markham

[11] Patent Number: 5,453,159
[45] Date of Patent: Sep. 26, 1995

[54] DEINKING OF RECYCLED PULP

[75] Inventor: Larry D. Markham, Mobile, Ala.

[73] Assignee: International Paper Company, Purchase, N.Y.

[21] Appl. No.: 147,868

[22] Filed: Nov. 4, 1993

[51] Int. Cl.$^6$ .............................. D21B 1/08; D21B 1/32
[52] U.S. Cl. ...................... 162/4; 162/5; 162/55; 162/57
[58] Field of Search ................. 162/4, 55, 261, 162/57

[56] References Cited

U.S. PATENT DOCUMENTS

| | | |
|---|---|---|
| 2,872,313 | 2/1959 | House et al. . |
| 3,425,897 | 2/1969 | Murphy, Jr. . |
| 4,000,031 | 12/1976 | Acobas . |
| 4,224,102 | 9/1980 | Mamers et al. . |
| 4,566,942 | 1/1986 | Holz et al. ............................... 162/4 |
| 4,619,736 | 10/1986 | Henricson et al. ..................... 162/261 |
| 4,816,117 | 3/1989 | Pfalzer et al. . |
| 5,059,280 | 10/1991 | Thompson ............................ 162/4 |
| 5,112,444 | 5/1992 | Henricson et al. .................... 162/55 |

FOREIGN PATENT DOCUMENTS 731949 6/1955 United Kingdom .

OTHER PUBLICATIONS

W. J. Fondow, "Pulping Of Secondary Fiber", Proceedings, Contaminant Problems, and Strategies in Wastepaper Recycling, TAPPI (1989), 21–31.

*Primary Examiner*—W. Gary Jones
*Assistant Examiner*—Calvin Padgett
*Attorney, Agent, or Firm*—Luedkea, Neely & Graham

[57] ABSTRACT

A process for separating printing ink from recycled paper fiber includes the steps of repulping recycled paper furnish with water in a rotary mixer for about 5 minutes at a consistency of 6% to 18% with a mixing element having a top speed no greater than 2,000 ft/min. This first stage repulping and mixing is followed by a second mixing stage of 20 to 45 minutes with a mixing element tip speed of 2,500 to 4,000 ft/min. Agglomerated contamination particles in the resulting slurry are removed by centrifugal cleaning and slot screening.

24 Claims, 2 Drawing Sheets

DEINKING OF RECYCLED PULP

The present invention relates to the art of contaminant removal from recycled printed paper sources.

The use of secondary fiber in the manufacture of paper is becoming increasingly important as the practice of recycling staple materials grows. The greater percentage of natural cellulose fiber available for recycling is from post consumer waste sources. Consequently, the most abundant supply of recycle source material is laden with printer's ink, plastic coatings, adhesives and similar contaminants.

A generally prevailing method of separating usable fibers from post consumer contamination includes the step of repulping. This process generally comprises the steps of combining post consumer waste paper with water in a large vessel having a powered agitation rotor driven about a vertical axis passing through the vessel center from the bottom thereof. The mechanically induced hydraulic turbulence of a pulper rehydrate the fiber to induce separation from the contaminants.

After a period of blending, the mixture is discharged from the vessel and processed through a series of screens and centrifugal separators to finish the segregation process.

This procedure is reasonably effective upon larger contamination particles. However, small particles of solidified ink have proven to be extremely elusive and difficult to isolate from the rehydrated fibers. Laser and non-impact printed ink has been especially difficult to remove.

To improve the process, deinking chemicals have been developed to induce agglomeration of the minute ink particles into larger particles that are more responsive to the separation devices. However, such deinking chemicals are expensive and are not entirely effective.

It is therefore an object of the present invention to improve the ink, stickies and contaminant removal efficiency of a post consumer paper recycling process.

Another object of the present invention is to reduce the usage of agglomeration chemicals in a post consumer waste paper repulping operation.

Another object of the present invention is to avoid the need for an expensive floatation deinking system for removal of ink and contaminants.

An additional object of the present invention is to produce a deinked pulp from post consumer waste paper of greater cleanliness and brightness.

A still further object of the present invention is to reduce the overall cost of deinking post consumer waste paper.

Having regard to the above and other objects and advantages, the present invention is directed to a process for separating ink particles and other contaminants from the fiber constituency of recycled paper which generally comprises forming an aqueous slurry of separated fibers from recycled fiber sources in at least two blending stages. In a first blending stage, the pulping apparatus agitation rotor is operated at a relatively low peripheral velocity, preferably less than about 2,000 ft/minute, for a first time interval while the mixture gently shears against itself and the rotor. It has been found that the ink and contaminants may be separated from the fiber without substantial attrition, and then agglomeration of the particles operates to strengthen them against later attrition. In a second blending stage, the agitation rotor is operated at a relatively high rotational velocity as compared to that of the first blending stage, preferably at least about 2,500 ft/minute, and is held at that velocity for a second time interval which is preferably at least about 15 minutes.

This multi-stage blending of the slurry using at least two substantially different mixer speeds, one substantially lower than the other, each for a sustained period of time, is found to promote attainment of larger contaminant particles to improve the separation efficiency of contaminant particle removal in repulping waste paper.

It has been found that among the various embodiments of the present invention, it is especially preferred to conduct the first stage at a rotor peripheral velocity in the range of from about 1000 to about 1800 ft/minute for about 5 minutes and to conduct the second stage after the first stage at a rotor perimeter velocity in the range of from about 2500 to about 4000 ft/minute for at least about 20 minutes.

These and other features and advantages of the invention will be further described in the following detailed description considered in conjunction with the accompanying drawings in which.

Figure 3:
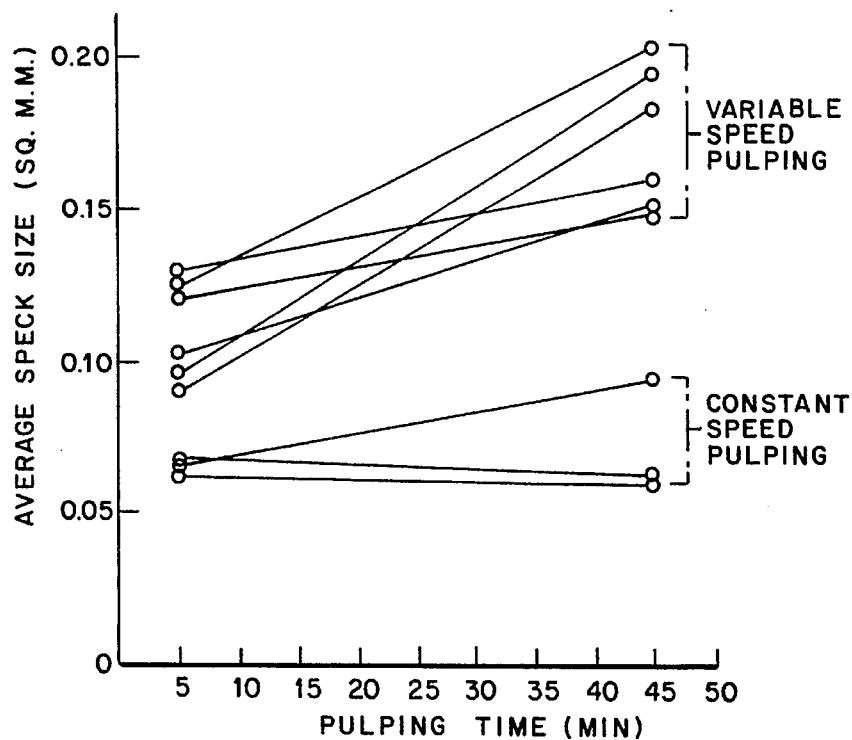
Figure 4:
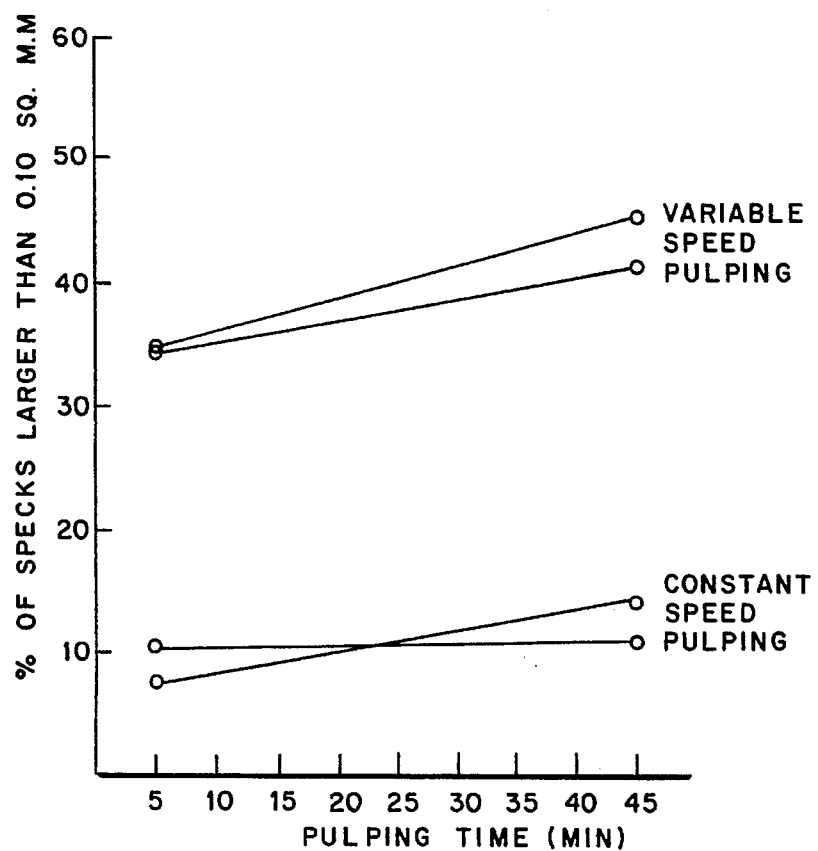

FIG. 3 is a graphic illustration of data developed to correlate the average size of ink specks dispersed through a pulp slurry at a 5 minute blending interval and at a 45 minute interval following therefrom; and FIG. 4 is a graphic illustration of data correlating the percentage of ink specks distributed through a pulp slurry that are larger than 0.10 sq.mm for a first blending stage at a relatively low velocity extending over a 5 minute interval followed by a second blending stage at relatively high velocities extending over a 45 minute interval, as compared to a constant pulping speed over the same intervals.

Figure 1:
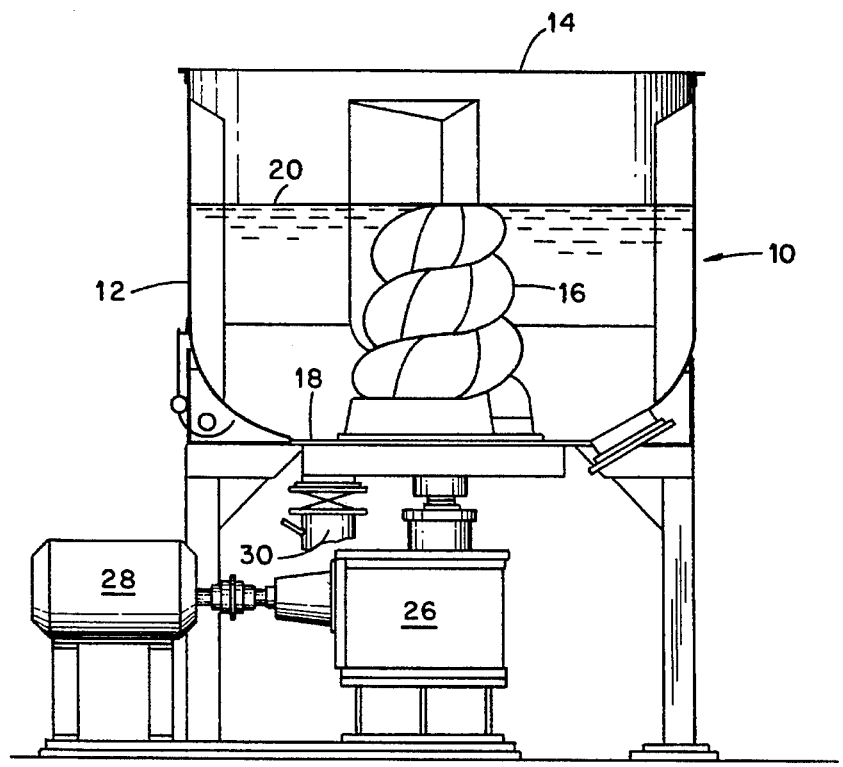
FIG. 1 is a cut-away drawing of a mechanical pulping apparatus for use in practicing the present invention.

With reference now to the drawings, a preferred apparatus for practicing the present invention is illustrated in FIG. 1 which shows a repulping machine 10 known in the art as a "hydrapulper", which includes a generally conically bottomed vessel 12 having an open top 14 and a turbine type rotor 16 rotatably driven from the bottom by a shaft about a vertical axis of rotation which coincides with the cone axis. A perforated screen 18 is situated around the rotor 16 with openings of various sizes, e.g. 1/16 in. diameter and higher, through which the disintegrated pulp is extracted.

The vessel 12 contains a slurry 20 which includes the conventional material to be repulped ranging from box cuttings to paper products such as sheets, bags and the like, tubes and cartons and any fibrous material which is desired to be recycled to recover the fiber elements thereof. The material may particularly include various contaminants in the nature of ink particles and the like which are to be separated from the recycled fiber for improvement of the resulting pulp quality.

Material to be recycled may be placed into the vessel 12 from a conveyor (not shown) or manually as is the practice in many mills. The consistency of the slurry may conventionally fall in the range of 5% to 18% and preferably about 10% to 15% by combining with the fibrous material a corresponding quantity of water.

Additionally, agglomeration promoting compounds and materials may be combined with the recycle slurry to induce the agglomeration and consolidation of ink and other contaminants. Other additives may be added to the slurry for still additional purposes and objectives. However, the fact that agglomeration chemicals may be used with the invention does not alter the significance of the inventive contribution since a feature of the invention is to either reduce the need for such agglomeration chemicals or eliminate the need entirely.

For a more expansive description of the construction and operation of a hydrapulper as used in a state-of-the-art paper de-inking system, reference is given to Fondow, W. J., "Pulping of Secondary Fiber", Proceedings, Contaminants, Problems and Strategies in Wastepaper Recycling; TAPPI (1989) pg. 21–31, the disclosure of which is incorporated herein by reference.

For practice of the present invention, the pulper rotor 16 may be driven by an electric motor 28 driven transmission 26 adapted to have the rotor achieve tip velocities of up to 5000 ft/minute, and for maintaining the velocity constant at desired levels over intervals of a few minutes up to an hour or more. The variable speed capacity may be obtained by either a variable speed motor, a select speed motor or a speed changeable transmissional 26.

In general, the invention comprises the process of hydrating a source of waste paper fiber in the exemplary apparatus 10 with a relatively gentle mechanical and hydraulic agitation to separate the fiber from the contamination material while avoiding reduction in the size of contaminant particles which may be released into the slurry in the process. As will be subsequently shown, ink speck removal efficiency is proportional to the average size of the ink specks within the slurry. Generally speaking, low dirt or ink removal efficiency means that a larger quantity of contamination particles, i.e., ink specks, remain distributed throughout the pulp slurry and are not conveniently separated from the slurry before it is used in the papermaking furnish. Ultimately, such remaining contamination will be laid into a new paper web with the recycled fiber, and serve to reduce the new web quality.

In accordance with the invention, improved separation efficiency of contaminant particles released from the fibers is achieved using multiple blending stages of repulper operation which include at least a relatively low velocity blending stage and a relatively high velocity blending stage. In the relatively low velocity stage, the slurry 20 is subjected to a velocity of the rotor blade 16 of no more than about 2000 ft/minute for several minutes, preferably no more than about 5 minutes. In the relatively high velocity stage which preferably follows the low velocity stage, the slurry is subjected to a rotor blade 16 velocity of at least about 2500 ft/minute for at least about 20 minutes or such other time as may be necessary to sufficiently agglomerate the liberated dirt, ink and contamination particles now freely suspended in the aqueous pulp slurry.

Most preferably, the relatively low speed stage lasts for about the first 5 minutes after the material is placed in the pulper 10 and is carried out at an average rotor tip velocity of about 1300 ft/minute. The velocity may be gradually increased during this period. The rotor tip velocity is then increased to about 3000 ft/minute, and held for about 20 to 45 minutes for completion of the second stage.

Upon completion of the foregoing blending stages, the slurry may be drawn from the hydrapulper through a discharge conduit as at 30 and passed through a coarse screening and then as a 1% to 2% adjusted consistency through a conventional slotted pressure screen (not shown) having relatively fine slot openings of 0.004 to 0.010 inch. This type of equipment comprises a cylindrical screen equipped with a rotor which is rotatively driven about its cylindrical axis within an enclosure. Pulp slurry is pumped axially through the screen. Acceptable fiber and proportional water passes through the screen slots. Unacceptable fiber such as shives and fiber bundles and agglomerated contamination i.e. dirt, ink, foreign particles, continue through the screen cylinder as the rejected flow stream.

Following the slotted pressure screens, the accepted flow stream is preferably next subjected to one or more stages of centrifugal cleaning wherein any remaining dirt and ink is segregated from desirable fiber on the physical property difference of weight or density.

The following non-limiting examples further illustrate various aspects of the invention. Unless otherwise indicated, all temperatures are in degrees fahrenheit and all percentages are by weight.

EXAMPLE 1

A series of tests were conducted using a hydrapulper equipped with a helical rotor and variable speed drive. The waste paper source was post consumer white paper containing laser printing.

Repulping was carried out for 45 minutes at 160° F., using a PPG Industries, Incorporated, agglomeration chemical PX-101 at a dosage rate of 0.3% and PM-200 at a dosage rate of 0.10%. Five tests were run, each at respective consistencies over a range of 11% to 6.4%.

At each pulp consistency, the speed of the pulper rotor was changed to obtain uniform mixing. In other words, the rotor was adjusted to obtain continuous movement of the pulper contents with no dead areas or areas of slow pulp movement. The minimum rotor speed necessary to obtain uniform mixing was used.

For the purpose of process testing and evaluation, a selected portion of the recycle slurry was further diluted to a consistency of about 1.5% for the production of laboratory handsheets. Such handsheets are necessary for an image analysis measurement of a dirt count and ink speck size.

The slurry was then screened with a pressurized slotted screen having 0.007 inch slot openings. Laboratory analysis handsheets were made from the slotted screen accepts and image analysis measurements taken again. Dirt removal efficiency was determined by TAPPI Test Method T-213 using the equation of the start/finish speck count differential divided by the starting speck count. Each speck count is produced by an image analyzer which produces total area data above a predetermined minimal speck size threshold. The test conditions and results were as follows:

Test No. 1

Pulper rotor speed was set at 1490 rpm against an 11.1% pulp consistency. The pulp pH was 11.0. After repulping, the average ink speck size was measured at 0.110 $mm^2$. The screening efficiency for ink speck removal was 17.6% using the 0.007 in. slotted screen.

Test No. 2

Pulper rotor speed was set at 1350 rpm against a pulp consistency of 9.4%. The pulp pH was 10.6. The average ink speck size was 0.182 $mm^2$ at the end of the 45 minutes repulping time. The screening efficiency for ink speck removal was 64.2% in this experiment, indicating an excellent agglomeration of the ink particles and a high degree of ink removal by slotted screening.

Test No. 3

Pulper rotor speed was set at 1200 rpm against a pulp consistency of 9.2%. Pulp pH was 11.0. The average size of the agglomerated ink particles was 0.179 $mm^2$. The ink removal efficiency in the slotted screen was 55.6%.

Test No. 4

Pulper rotor speed was set at 1200 rpm against a pulp consistency of 7.4%. Pulp pH was 9.5. At the end of the 45 minutes pulping time the average size of the agglomerated ink specks was 0.140 $mm^2$. The slotted screen removed 40.6% of the ink.

Test No. 5

Pulper rotor speed was set at 650 rpm against a pulp consistency of 6.4%. The pulp pH was 10.2. At the end of the 45 minute test the average ink speck size increased to only 0.100 $mm^2$. Only 15.7% of the ink was removed by slotted screening.

Figure 2:
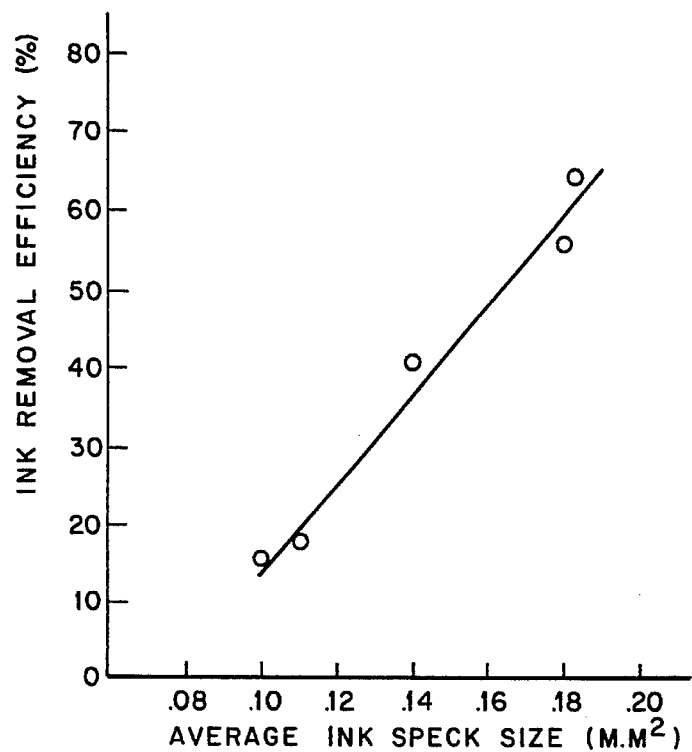
FIG. 2 is a graphic illustration of data developed from deinking laboratory tests for the purpose of correlating ink removal efficiency to the average size of ink specks dispersed through a pulp slurry.

The foregoing test data is reproduced below in Table 1 and graphically represented by FIG. 2, which demonstrates the correlation between the average ink speck size and the efficiency of the screens in removing the respective ink specks.

EXAMPLE II

Another series of tests was conducted to demonstrate the effect of two-speed pulping using a hydrapulper equipped with a helical rotor and variable speed drive. In this series of tests, the waste paper contained a mixture of impact printed and non-impact printed paper. The pulp temperature was 160° F. and agglomeration chemical dosage was a 0.8% proprietary mixture of one or more $C_5$–$C_{20}$ alkanols and nonionic surfactants and 0.3% NaOH on O.D. paper. The test results are reported below in Table 2 and plotted graphically in FIGS. 3 and 4.

TABLE 2

| Test No. | 1 | 2 | 3 | 4 | 5 | 6 | 7 | 8 | 9 |
|---|---|---|---|---|---|---|---|---|---|
| PULPER | | | | | | | | | |
| Rotor Perim. Speed 1st 5 min: ft/min. | 1270 | 1270 | 3780 | 1310 | 1270 | 1270 | 1270 | 3780 | 3780 |
| Rotor Perim. Speed Remainder: ft/min. | 3060 | 3780 | 3780 | 3780 | 2700 | 2700 | 3780 | 3780 | 3780 |
| PULP CONSISTENCY: % | 8.7 | 8.7 | 8.7 | 6.6 | 6.6 | 6.6 | 6.6 | 6.6 | 6.6 |
| FURNISH: % of Non-Impact Printed | 25 | 25 | 25 | 10 | 25 | 50 | 50 | 50 | 50 |
| Speck Size at 45 Min. | | | | | | | | | |
| Average, $mm^2$ | 0.19 | 0.20 | 0.10 | 0.21 | 0.16 | 0.15 | 0.15 | 0.06 | 0.06 |
| % Larger than 0.10 $mm^2$ | 55 | 39 | 23 | 54 | 46 | 42 | 46 | 12 | 15 |

Particular note should be made of test runs 3, 8 and 9 wherein the rotor speed (3780 rpm) was held constant throughout the 45 minute test interval as contrasted with the two-stage runs 1, 2 and 4–7 where the average rotor speed in the first five minutes ranged from 1270 to 1310 rpm. As can be seen, the two-stage runs produced considerably larger specks which translates into significantly improved removal efficiencies as demonstrated by FIG. 2 and in Table 1.

EXAMPLE III

Another set of tests was conducted to measure the "before" and "after" dirt counts on handsheets prepared from fiber processed by the subject invention.

The repulping apparatus used for repulping laser printed material consisted of a 14 ft. diameter hydrapulper equipped with a turbine type rotor.

At the conclusion of pulper processing, a sufficient quantity of blended slurry was extracted from the pulper vat for the purpose of handsheet formation, image analysis and the "before" dirt count. Thereafter, the stock was transferred to

TABLE 1

| Test No. | Pulp Consistency (%) | Rotor Speed (rpm) | Peripheral Speed (ft/min) | Consistency × Peripheral Speed | Final Ink Speck Size ($mm^2$) | Ink Removal Efficiency by Slotted Screening (%) |
|---|---|---|---|---|---|---|
| 1 | 11.1 | 1490 | 4284 | 47552 | 0.110 | 17.6 |
| 2 | 9.4 | 1350 | 3881 | 36481 | 0.182 | 64.2 |
| 3 | 9.2 | 1200 | 3450 | 31740 | 0.179 | 55.6 |
| 4 | 7.4 | 1200 | 3450 | 25530 | 0.140 | 40.6 |
| 5 | 6.4 | 650 | 1869 | 11962 | 0.100 | 15.7 | a dump chest and diluted to about 4.0% consistency. For screening, the pulp was diluted again to about 1.0% consistency by the addition of water in the suction pipe of the pressure screen supply pump.

Accepts from the centrifugal cleaners provided the handsheet slurry source for the "after" dirt count. The test conditions and results were as follows:

Test No. 1

The slurry contained 0.15% agglomeration chemical calculated on dry pulp. The average pulping temperature was 153° F. The average pulp pH was 10.2 and the pulp consistency was 6.7%. Total pulping time was 45 minutes. The pulper was equipped with a variable speed drive.

For the first 5 minutes of the test, the pulper rotor was driven at a peripheral speed of 1763 ft./minute. Subsequently, the speed was raised to 3,173 ft./minute and held for the remaining 40 minutes of repulping. The pulper batch was then dumped to a chest and processed through slotted screening followed by two sets of centrifugal cleaners.

The agglomerated ink was removed in the screening and cleaning so that the dirt count in the pulp was reduced from 1,590 ppm to 43 ppm, measured using an image analyzer to count dirt specks larger than 0.03 mm$^2$ similar to TAPPI Test Method T213. The deinked pulp was used to successfully manufacture publication paper that was blade coated on both sides of the sheet. The blade coating process is particularly demanding of paper with recycled fiber content due to the propensity for contamination particles to stick to the coating blade and create machine direction coating streaks.

Test No. 2

In this test, the equipment was the same as in Test 1 but the waste paper was of a different source. Pulping conditions included a 10.7 pH, a 168° F. temperature, a 6.0% pulp consistency and a 1.0% dosage of proprietary agglomeration mixture. The initial perimeter velocity for the pulping rotor was 1,763 ft/minute. This speed was gradually increased over a period of 20 minutes to a maximum of 3,173 ft./minute, and held for 25 minutes. The average speed of the first 5 minutes was 1,939 ft./minute. The amount of time spent at a speed above 2,500 ft./minute was 35 minutes. The dirt content of the pulp was reduced from 3,260 ppm to 6 ppm by screening and centrifugal cleaning. The pulp was ultimately used to manufacture coated publication paper of high quality.

Having thus fully disclosed my invention, those of ordinary skill in the art will perceive numerous modifications, substitutions, rearrangements and equivalencies within the scope and spirit of appended claims,

I claim:

1. In a process for recovering fiber constituents from recycled fibrous cellulose material containing ink particles and other contaminants to be separated from the recovered fiber constituents which involves forming an aqueous slurry containing the recycled fibrous cellulose material and mixing the slurry with a mechanical agitator rotated about a substantially vertical axis to reduce the cellulose material to liberate fiber and contaminant particles therefrom into the slurry, the improvement which comprises mixing the slurry in a first blending stage at a relatively low agitator velocity for a first time interval and mixing the slurry in a second blending stage at a relatively high velocity of the same agitator as compared to that of the first blending stage and for a second time interval substantially longer than that of the first blending stage, whereby the ink particles and other contaminants in the resulting slurry are more readily separated from said fiber constituents.

2. The process of claim 1 wherein said second blending stage time interval follows said first blending stage time interval.

3. The process of claim 1, wherein the slurry has a consistency of between about 6% and 18%.

4. The process of claim 1, further comprising the step of adding an agglomeration agent to the slurry.

5. The process of claim 1, wherein said relatively low velocity of said agitator is provided by a rotor having a tip speed of less than about 2000 ft/minute and said relatively high velocity includes a rotor tip speed of greater than about 2500 ft/minute.

6. The process of claim 1 wherein said mechanically rotating agitation means comprises a turbine type rotor.

7. The process of claim 1 wherein said ink particles and other contaminants are separated from said fiber constituents by screening and centrifugal cleaning.

8. The process of claim 7 wherein said ink particles and other contaminants are separated by screens having 0.004 in. to 0.010 in. slotted openings.

9. The process of claim 1, wherein ink particles and other contaminants separated from said slurry are agglomerated to an average particle size of at least about 0.15 mm$^2$ and at least about 30% of such agglomerated particles are larger than about 0.10 mm$^2$.

10. A process for separating ink particles and other contaminants from the fiber constituency of recycled paper comprising the steps of forming an aqueous slurry from recycled cellulosic fiber sources having printing ink and other contaminants combined therewith, mixing said slurry with agitation means rotating about a substantially vertical axis at a first rotational velocity for such a period of time as to cause particles of said ink and other contaminants to separate from respective fiber support followed by mixing said slurry at a second rotational velocity of said agitation means to agglomerate separated ink and other contamination particles into and with larger contamination particles; and separating agglomerated ink and other contamination particles from the remainder of said slurry.

11. The process of claim 10, wherein the slurry has a consistency of between about 6% and 18%.

12. The process of claim 10, further comprising the step of adding an agglomeration agent to the slurry.

13. The process of claim 10, wherein said first rotational velocity of said agitation means is provided by a rotor having a tip speed of less than about 2000 ft/minute and said second rotational velocity includes a rotor tip speed of greater than about 2500 ft/minute.

14. The process of claim 10 wherein said mechanically rotating agitation means comprises a turbine type rotor.

15. The process of claim 10 wherein said agglomerated contamination particles are separated from the remainder of said slurry by screening and centrifugal cleaning.

16. The process of claim 15 wherein said agglomerated contamination particles are separated by screens having 0.004 in. to 0.010 in. slotted openings.

17. The process of claim 10, wherein the average size of the agglomerated ink and other contamination particles separated from said slurry is at least about 0.15 mm$^2$ and at least about 30% of the agglomerated particles are larger than about 0.10 mm$^2$.

18. A process for recycling papermaking fiber having printer's ink and other contaminants combined therewith, said process comprising the steps of combining paper and water in a repulping vessel that is agitated by a vertical axis rotary mixing element, said paper including fiber support of ink and other contaminants; mixing said paper, water, ink and contaminants in said vessel to a slurry consistency of about 6% to about 18% at a mixing element tip speed of no greater than 2000 ft/minute for a first interval of time sufficient to separate ink and other contaminants from corresponding paper fiber support; increasing the tip speed of said mixing element to at least 2500 ft/minute for a second period of time sufficient to agglomerate ink and other particulate contaminants to an average agglomerated particle size of about 0.15 mm$^2$ or greater whereby at least 30% of said agglomerated particles are larger than about 0.10 mm$^2$; and, separating said agglomerated particles from said slurry.

19. A process for recycling papermaking fiber as described by claim 18 wherein said rotary mixing element is a turbine type rotor.

20. A process for recycling papermaking fiber as described by claim 18 wherein said agglomerated particles are separated from said slurry by screening and centrifugal cleaning.

21. A process for recycling papermaking fiber as described by claim 20 wherein said agglomerated particles are separated by screens having 0.004 in. to 0.010 in. slotted openings.

22. In a process for recycling the fiber constituency of printed paper having ink and other contaminants combined therewith wherein said ink contaminated paper is combined with water of approximately 130° F. to 180° F. in a mixing vessel having a vertical axis rotary mixing element to form a slurry of about 6% to about 18% consistency to separate particles of ink and other contaminants from corresponding fiber support and subsequently screening and centrifugally segregating said ink and other contaminant particles from said slurry, the improvement comprising the steps of driving said mixing element at a tip speed of no greater than 2000 ft/minute for an initial slurry mixing interval to separate said particles of ink and other contaminants from corresponding fiber support and subsequently increasing said mixing element tip speed to at least 2500 ft/minute for agglomeration of said fiber separated particles into larger combinations of said particles.

23. In a process for recycling the fiber constituency of printed paper as described by claim 22 wherein said rotary mixing element is a turbine type rotor.

24. In a process for recycling the fiber constituency of printed paper as described by claim 22 wherein said ink and other contaminant particles are segregated from said slurry by screens having 0.004 in. to 0.010 in slotted openings.

* * * * *